United States Patent [19]
Matt et al.
[11] Patent Number: 4,559,275
[45] Date of Patent: Dec. 17, 1985

[54] PERFORATED PLATE FOR EVENING OUT THE VELOCITY DISTRIBUTION

[75] Inventors: Bernhard Matt, Rickenbach/Bergalingen, Fed. Rep. of Germany; Theo Woringer; Gerassime Zouzoulas, both of Zurich, Switzerland

[73] Assignee: BBC Brown, Boveri & Company, Limited, Baden, Switzerland

[21] Appl. No.: 505,845

[22] Filed: Jun. 20, 1983

[30] Foreign Application Priority Data

Jun. 23, 1982 [CH] Switzerland ........................ 3835/82

[51] Int. Cl.$^4$ ................................................ B32B 3/10
[52] U.S. Cl. .................................... 428/596; 428/131; 73/861.52; 137/625.28; 138/37
[58] Field of Search ............... 428/596, 131, 137, 134; 138/37, 40, 39, 41; 73/861.52; 137/625.28; 210/498

[56] References Cited

U.S. PATENT DOCUMENTS 3,840,051 10/1974 Akashi et al. ......................... 138/37
4,262,049 4/1981 Kaspar ................................ 428/131

FOREIGN PATENT DOCUMENTS 1166940 10/1969 United Kingdom ................ 210/498

*Primary Examiner*—Alexander S. Thomas
*Attorney, Agent, or Firm*—Burns, Doane, Swecker & Mathis

[57] ABSTRACT

In a perforated plate (1) for evening out the velocity distribution in a flow channel, the passage holes (2) are designed as shock diffusers arranged in parallel. For this purpose, they are provided with an inlet diameter (d) on the inflow side (3) and with a larger outlet diameter (D) on the outflow side (4) of the perforated plate. Due to this design, a relatively large blocking (area ratio of blocked flow cross-section to the free flow cross-section) on the inflow side and a relatively small blocking on the outflow side of the perforated plate are obtained. To ensure a shock diffuser effect, the length of the outlet holes must be sized such that the flow makes contact again before the outlet edge thereof. Important advantages of this perforated plate are that, with a relatively low pressure drop coefficient, a very good evening-out effect and a short back-flow zone on the outflow side of the perforated plate are achieved. Perforated plates of this type are used in the construction of turbo machines, in particular in gas turbines.

6 Claims, 5 Drawing Figures

PERFORATED PLATE FOR EVENING OUT THE VELOCITY DISTRIBUTION

The invention relates to a perforated plate for evening out the velocity distribution in a flow channel, which plate is provided with a plurality of passage holes in a uniform or rotationally symmetrical arrangement.

Perforated plates of this type are used for converting an uneven velocity distribution, and in some cases a flow affected by spin, in a flow channel into a flow parallel to the axis and having an even velocity distribution. Such perforated plates are normally arranged perpendicular to the main flow direction in the flow channel. A preferred application of perforated plates of this type is the evening-out and stabilisation of the flow between the combustion chamber and the blading of a gas turbine.

Perforated plates of the type mentioned above are known. One design has been shown and described in the journal "Chemie-Ing.-Technik", 44, 1972/No. 1+2, pages 72 to 79.

In this solution, uniformly arranged passage holes are either cylindrical with a sharp-edged or rounded hole inlet or they are provided with an inlet cone or outlet cone, the hole diameters normally being equal to or greater than the plate thickness. Due to the use of cylindrical holes, the blocking or the area ratio of the blocked flow cross-section to the free flow cross-section on the inflow side becomes equal to that on the outflow side. The greater the blocking of a perforated plate, the greater is the resulting pressure drop and the evening-out effect on the velocity distribution of the flow. Disadvantages of the perforated plates with large blocking are the high pressure drops and long back-flow zones behind the webs of the perforated plate as well as the risk of several individual beams combining behind the perforated plate.

It is the object of the invention to provide a perforated plate, by means of which as complete as possible an evening-out of the velocity distribution is achieved, coupled with a favourable pressure drop coefficient and a relatively short back-flow zone.

According to the invention, this object is achieved when the passage holes are widened stepwise in the direction of flow, in such a way that they form single-stage or multi-stage shock diffusers arranged in parallel.

The advantages achieved by the invention are essentially that, due to the diffuser effect of the passage holes, a large part of the velocity energy of the accelerated working medium is reconverted into pressure energy in the widened part of the passage holes, whereby the overall pressure drop of the perforated plate is reduced. Moreover, the small outlet blocking leads to a relatively short back-flow zone.

Another way of achieving the object is characterised in that the passage holes are formed as diffusers which have a rheologically favourable profile and a steady widening of the flow cross-section. In this case, the advantage obtained is that, while the evening-out of the velocity distribution remains the same, the pressure resistance coefficient is even further reduced, in comparison with shock diffusers.

In a rotationally symmetrical arrangement of the holes in a circular or annular flow channel, it is advantageous to size the spacings and the diameters of the holes such that constant blocking over the entire flow cross-section is obtained, that is to say no areas having different blocking are formed around the periphery of the perforated plate.

An illustrative embodiment of the subject of the invention is shown in a simplified way in the drawing, in which:

FIG. 5 shows a section similar to that in FIG. 3, on an enlarged scale, with streamlines drawn in.

In all the figures, identical parts are provided with identical reference numerals. The flow directions are marked with arrows. Components not essential to the invention, such as, for example, channel walls, elements for fixing the perforated plates, and the like, have been omitted.

A perforated plate 1 consists of a metal plate, the shape and thickness of which depends on the cross-section of the flow channel which is not shown. For example, a perforated plate can be circular, rectangular or annular. The hole arrangement can be rectangular, triangular or rotationally symmetrical. The holes are normally punched or drilled.

To this extent, the perforated plates are known. According to the invention, the passage holes then have the shape of single-stage shock diffusers. The passage holes 2 which are rounded on the inflow side 3 of the perforated plate 1 and have a hole diameter d, are widened to the hole diameter D in the outflow direction. However, a condition for the establishment of a shock diffuser effect is that the outlet hole length L is such that the flow makes contact again before the end of this length, or that the limiting value, known in rheology, of the widening angle (10°–20°) is not exceeded.

Figure 1:
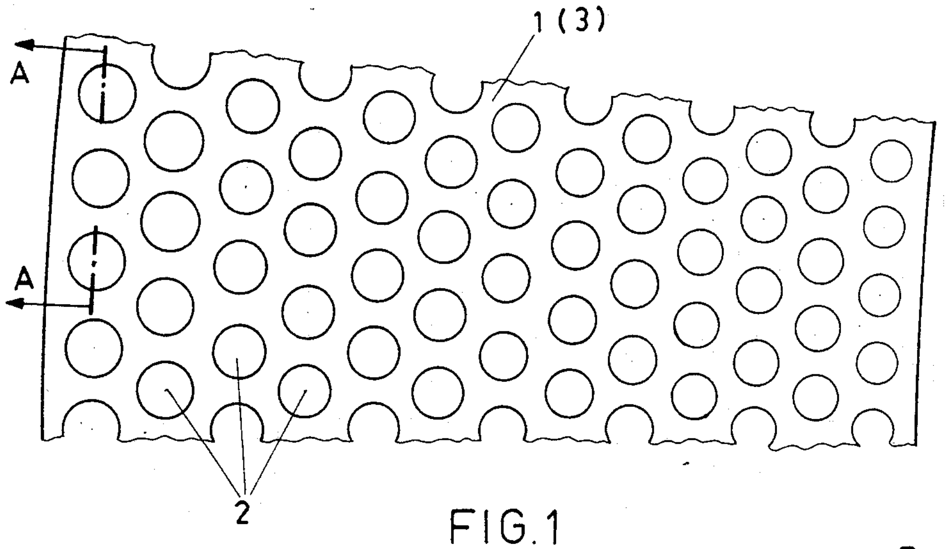
FIG. 1 shows a view from the inflow side of a segment of an annular perforated plate with a rotationally symmetrical arrangement of the holes.
Figure 2:
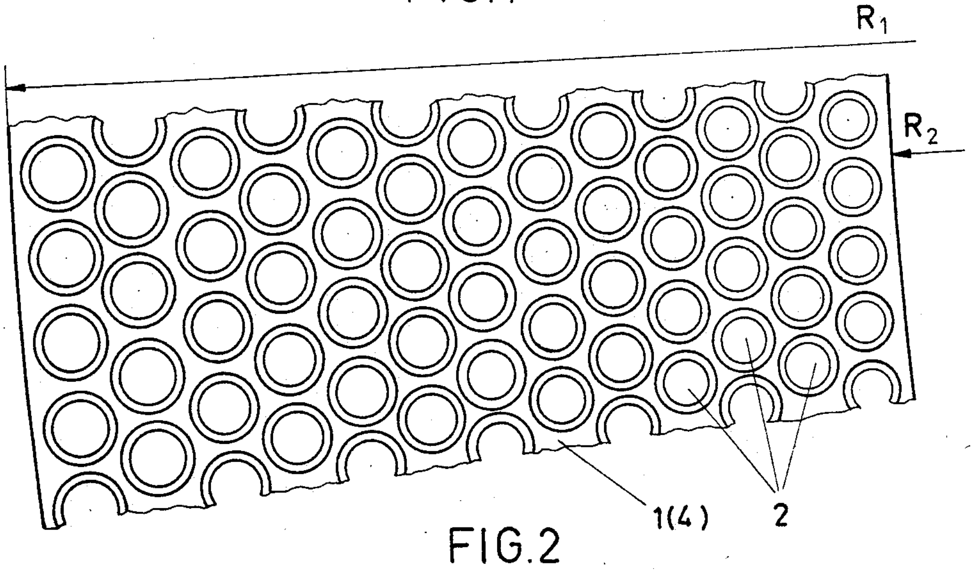
FIG. 2 shows a view from the outflow side of the segment according to FIG. 1.

The illustrated annular perforated plate 1, of which only a segment is shown in the view from the inflow side 3 in FIG. 1 and from the outflow side 4 in FIG. 2, is suitable for installation in an annular flow channel having an external radius $R_1$ and an internal radius $R_2$. In the present case, a rotationally symmetrical arrangement of the holes is perferably selected since, with a rectangular or triangular arrangement of holes in a circular or annular flow channel, zones with uneven blocking would be formed in the region of the internal and external walls of the flow channel. Since, however, only constant blocking over the entire cross-section of the channel ensures perfect evening-out of the flow, the hole diameters and hole spacings are sized such that both the inlet blocking and the outlet blocking are constant on all radii. This condition is met if the hole diameters d and D or hole spacings are an ascending linear function of the radius. The inlet blocking is here related to the hole inlet diameter d and the outlet blocking is related to the hole outlet diameter D.

Figure 3:
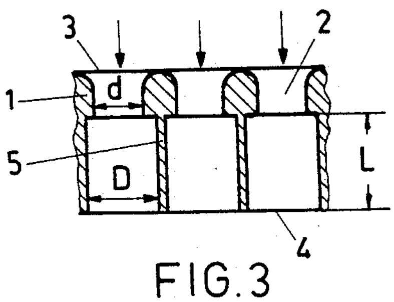
FIG. 3 shows a section A—A according to FIG. 1, the passage holes being provided with a single-stage shock diffuser.

FIG. 3 shows a peripheral section along the line A—A according to FIG. 1. On the inflow side 3 of the perforated plate 1, the passage holes 2 are provided with a rheologically favourable run-in. The hole inlet diameters d and the hole outlet diameters D as well as the hole spacings in the radial and tangential directions are a function of the given inlet and outlet blocking, respectively, of the perforated plate 1. The magnitude of the inlet and outlet blocking or their ratio cannot be given here, since they depend on too numerous flow parameters; nevertheless, this ratio can readily be determined by those skilled in the art. In principle, the inlet blocking depends, inter alia, on the unevenness of the flow which has taken place and on the desired evening-out effect. By contrast, the outlet blocking depends on the permissible pressure drop at the perforated plate and on a permissible length of the back-flow zone.

The outlet hole length L is sized such that the flow makes contact again just before the outlet edge of the hole.

Figure 4:
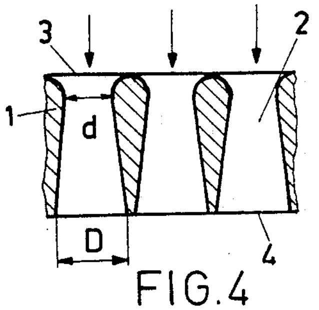
FIG. 4 shows a section similar to that in FIG. 3, the passage holes being provided with a rheologically favourable diffuser.

The design according to FIG. 4 represents a second possible solution. With the same hole arrangement and the same hole inlet diameter d and hole outlet diameter D as in FIG. 3, that is to say with the same inlet and outlet blocking, the passage holes are formed as diffusers which have a rheologically favourable profile and a steady widening of the flow cross-section. This design has the advantage that, with the evening-out effect and the length of the back-flow zone remaining the same, the pressure drop coefficient becomes even more favourable. Compared with the design shown in FIG. 3, however, the manufacturing costs are somewhat higher.

Figure 5:
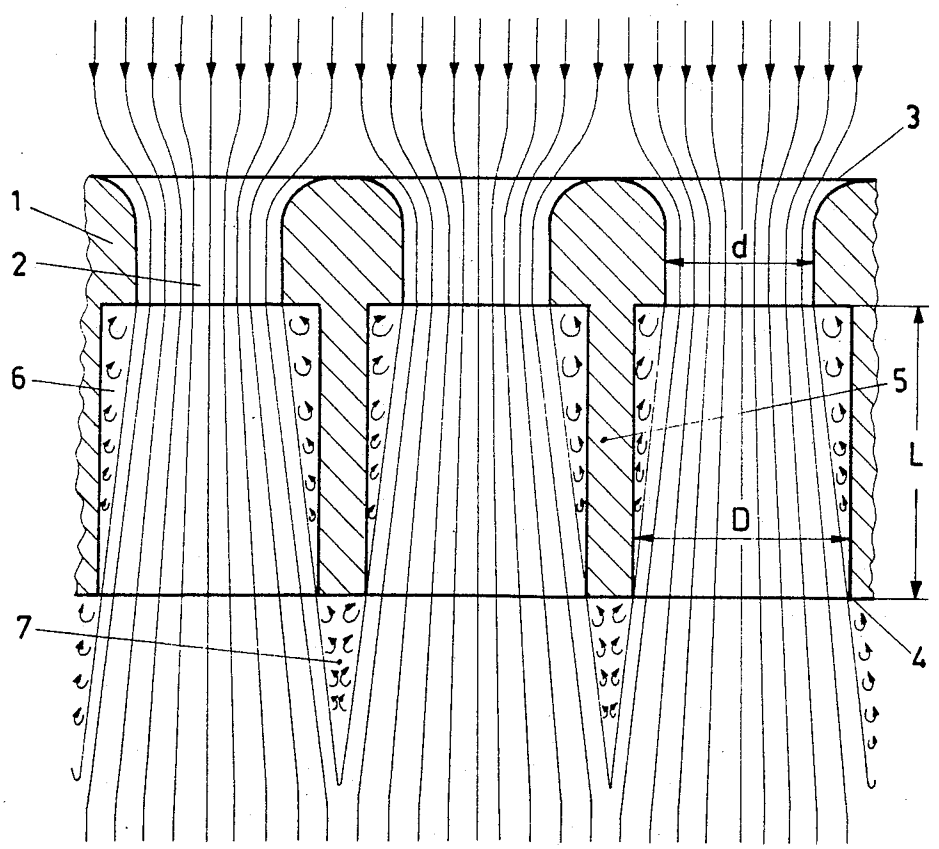

The mode of action and the flow processes at the perforated plate according to the invention can be explained as follows. Due to the large inlet blocking, a back-pressure zone is formed on the inflow side 3 of the perforated plate 1, and consequently a substantial evening-out of the velocity distribution in the passage holes 2 takes place. After entry into the passage holes 2, the streamlines are, according to FIG. 5, constricted to the diameter d, due to the rounding of the inlet edge of the holes, and subsequently widen to the hole outlet diameter D, if the outlet hole length L is sufficient. Due to the step-like transition between the hole inlet diameter d and the hole outlet diameter D, shock diffusers arranged in parallel are obtained. At the start of the enlarged hole, an eddy zone 6 is formed which has an influence on the overall pressure drop.

Downstream of the perforated plate 1, the flow requires a certain length before it adapts itself again to the free cross-section of the flow channel. This length which depends on the thickness of the web 5 between the holes or on the design of the shock diffuser, is called the back-flow zone 7. With some types of flow apparatus, it is very important to keep the back-flow zone 7 as short as possible.

Because of the diffuser effect, a favourable flow on the outflow side 4 of the perforated plate 1 or a very short back-flow zone as well as a low pressure drop coefficient are obtained.

If the passage holes are designed as rheologically favourable diffusers with a steady widening of the flow cross-section, according to FIG. 3, the eddy zone 6 and its influence on the overall pressure drop disappear.

Thus, for example, a perforated plate forming part of the state of the art and having cylindrical holes and constant blocking of 61% would have a pressure drop coefficient of about 5 at a Reynolds number of about $1\times10^5$. If the perforated plate is then sized, at the same inlet blocking of 61%, with a widening of the hole outlet cross-section in such a way that an outlet blocking of 21.6% is reached, the pressure drop coefficient in front of the perforated plate, with the flow conditions remaining the same, is reduced to a value of 3.2 and the back-flow zone becomes substantially shorter. Moreover, within the range of the abovementioned outlet blocking, there is no risk of the individual streams combining on the outflow side of the perforated plate.

Of course, the invention also comprises perforated plates having a uniform rectangular or triangular hole arrangement, and those passage holes which are designed in the shape of a two-stage or multi-stage shock diffuser.

We claim:

1. In a perforated plate for evening out the velocity distribution in a flow channel of the type in which the plate is provided with a plurality of passage holes, the improvement wherein the passage holes are widened stepwise in the flow channel direction of flow so that the holes form shock diffusers arranged in parallel, said plate having a rotationally symmetrical arrangement of the holes, spacings and diameters of the holes being sized such that local area ratios of blocked flow cross-section to free flow cross-section on inflow and outflow sides of the perforated plate are constant over the entire cross-sectional flow area of the flow channel.

2. A perforated plate according to claim 1, wherein said plate has a uniform arrangement of the holes, spacings and diameters of the holes are sized such that local area ratios of blocked flow cross-section to free flow cross-section on inflow and outflow sides of the perforated plate are constant over the entire cross-sectional flow area of the flow channel.

3. A perforated flow channel according to claim 2, wherein the holes form a single-stage shock diffuser.

4. A perforated flow channel according to claim 2, wherein the holes form a multi-stage shock diffuser.

5. A perforated flow channel according to claim 1, wherein the holes form a single-stage shock diffuser.

6. A perforated flow channel according to claim 1, wherein the holes form a multi-stage shock diffuser.

* * * * *